US012606184B2

(12) United States Patent
Cao et al.

(10) Patent No.: US 12,606,184 B2
(45) Date of Patent: Apr. 21, 2026

(54) ACCELERATION-PEDAL CONTROL METHOD, APPARATUS AND SYSTEM

(71) Applicant: WEICHAI POWER CO., LTD., Weifang (CN)

(72) Inventors: Yuan Cao, Weifang (CN); Fenggang Li, Weifang (CN); Daichang Guo, Weifang (CN); Baoan Ding, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 18/843,297

(22) PCT Filed: May 12, 2023

(86) PCT No.: PCT/CN2023/093736
§ 371 (c)(1),
(2) Date: Sep. 2, 2024

(87) PCT Pub. No.: WO2024/103654
PCT Pub. Date: May 23, 2024

(65) Prior Publication Data
US 2025/0178621 A1      Jun. 5, 2025

(30) Foreign Application Priority Data

Nov. 17, 2022    (CN) .......................... 202211440130.8

(51) Int. Cl.
*G06G 7/70*         (2006.01)
*B60W 50/06*        (2006.01)
*B60W 50/10*        (2012.01)

(52) U.S. Cl.
CPC ............ *B60W 50/06* (2013.01); *B60W 50/10* (2013.01); *B60W 2510/0657* (2013.01); *B60W 2520/00* (2013.01)

(58) Field of Classification Search
CPC ... B60K 26/02; B60W 10/06; B60W 2540/10; B60W 10/04; B60W 10/08; F02D 11/105; B60L 2250/26
(Continued)

(56) References Cited

U.S. PATENT DOCUMENTS

| | | | | |
|---|---|---|---|---|
| 11,675,937 B2 * | 6/2023 | Oswald | ............... | G01M 17/007 |
| | | | | 703/8 |
| 12,187,302 B2 * | 1/2025 | Di Lisa | ............... | B60W 50/082 |

(Continued)

FOREIGN PATENT DOCUMENTS

| | | |
|---|---|---|
| CN | 104828090 A | 8/2015 |
| CN | 105667513 A | 6/2016 |

(Continued)

OTHER PUBLICATIONS

Russian First Office Action issued on Feb. 26, 2025 for the Russian counterpart application No. 2024129170.

(Continued)

*Primary Examiner* — Hung Q Nguyen
*Assistant Examiner* — James J Kim
(74) *Attorney, Agent, or Firm* — Yue (Robert) Xu; Apex Attorneys at Law, LLP

(57)            ABSTRACT

An acceleration-pedal control method, apparatus and system are provided. The acceleration-pedal control method comprises: acquiring an accelerator torques MAP1, MAP2, MAP3 and MAP4; on the basis that the initial value of a counter is 0 and a vehicle speed meets a preset vehicle speed condition, the counter starting to count; controlling an acceleration pedal to operate according to an accelerator torque MAP0 in case of the counter value of 0, according to the accelerator torque MAP1 in case of the counter value of 1, according to the accelerator torque MAP2 in case of the counter value of 2, according to the accelerator torque (Continued)

MAP3 in case of the counter value of 3, and according to the accelerator torque MAP4 in case of the counter value of 4.

9 Claims, 4 Drawing Sheets

(58) Field of Classification Search
USPC ........................................................ 701/102
See application file for complete search history.

(56) References Cited

U.S. PATENT DOCUMENTS

| | | | | |
|---|---|---|---|---|
| 2008/0300768 | A1* | 12/2008 | Hijikata | F02D 41/021 |
| | | | | 701/102 |
| 2013/0046429 | A1* | 2/2013 | Tashiro | B60W 10/08 |
| | | | | 180/65.265 |
| 2015/0158498 | A1 | 6/2015 | Jeon et al. | |
| 2018/0154797 | A1* | 6/2018 | Sawada | B60L 7/26 |
| 2022/0121925 | A1* | 4/2022 | Amir | G06F 17/10 |
| 2023/0166741 | A1* | 6/2023 | Ga | B60W 40/09 |
| | | | | 701/1 |

FOREIGN PATENT DOCUMENTS

| | | | |
|---|---|---|---|
| CN | 107472235 | A | 12/2017 |
| CN | 112519575 | A | 3/2021 |
| CN | 113492868 | A | 10/2021 |
| CN | 115723757 | A | 3/2023 |
| DE | 102014107961 | A1 | 6/2015 |
| RU | 2748955 | C2 | 6/2021 |

OTHER PUBLICATIONS

International Search Report for PCT/CN2023/093736 mailed Aug. 6, 2023, ISA/CN.

* cited by examiner

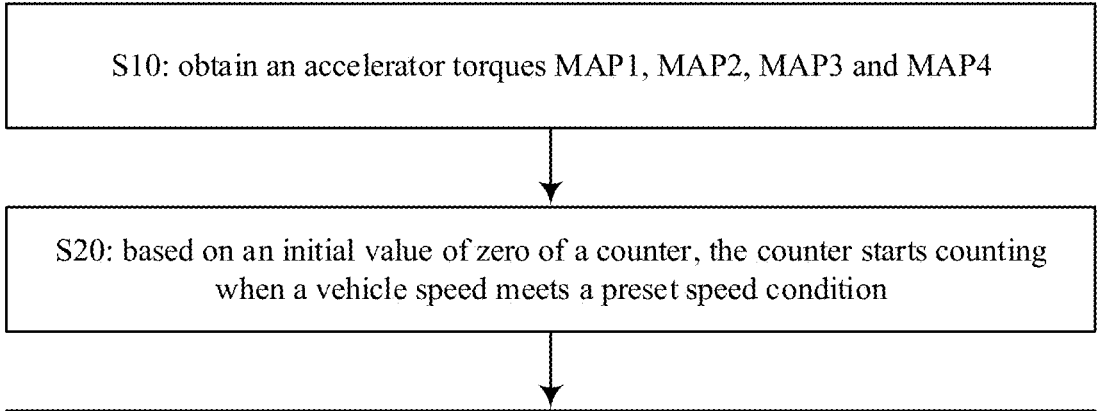

S10: obtain an accelerator torques MAP1, MAP2, MAP3 and MAP4

S20: based on an initial value of zero of a counter, the counter starts counting when a vehicle speed meets a preset speed condition S30: control the acceleration-pedal to operate according to the accelerator torque MAP0 in case of the counter value of zero, according to the accelerator torque MAP1 in case of the counter value of 1, according to the accelerator torque MAP2 in case of the counter value of 2, according to the accelerator torque MAP3 in case of the counter value of 3, or according to the accelerator torque MAP4 in case of the counter value of 4

FIG. 1

ACCELERATION-PEDAL CONTROL METHOD, APPARATUS AND SYSTEM

The present application is a National Phase entry of PCT Application No. PCT/CN2023/093736, filed on May 12, 2023, which claims the priority to Chinese Patent Application No. 202211440130.8, titled "ACCELERATION-PEDAL CONTROL METHOD, APPARATUS AND SYSTEM", filed with the China National Intellectual Property Administration on Nov. 17, 2022, which is incorporated herein by reference in its entirety.

FIELD

The present application relates to the technical field of vehicles, for example, to an acceleration-pedal control method, an acceleration-pedal control apparatus and an acceleration-pedal control system.

BACKGROUND

In a process of driving a vehicle, the driver controls an acceleration-pedal opening of the vehicle to change an engine output torque, so that the power torque of the vehicle meets the actual driving needs. When the engine output torque is controlled based on pre-calibrated parameters, a relationship between the acceleration-pedal opening and the engine output torque has been determined in advance. In a controlling process, the engine only mechanically changes the output torque according to the calibration result in response to change of the acceleration-pedal opening.

However, a desired engine output torque may be different depending on different road conditions and different driving needs. If only a single acceleration-pedal map is used, it is difficult for the driver to control the accelerator. Invalid pedal fluctuations, excessive stepping of the driver on the accelerator or the like can worsen the fuel economy of the entire vehicle and increase vehicle emissions.

SUMMARY

The present application provides an acceleration-pedal control method, an acceleration-pedal control device and an acceleration-pedal control system, which can not only meet the driving needs of the drivers but also be adapted to driving habits of different drivers.

An acceleration-pedal control method is provided in a first aspect of the present application, which includes the steps of:

obtaining an accelerator torque MAP1, an accelerator torque MAP2, an accelerator torque MAP3, and an accelerator torque MAP4;

based on an initial value of a counter equaling to zero, starting counting with a counter when a vehicle speed meets a preset speed condition; and in case that the counter value equals to zero, controlling an acceleration-pedal to operate according to an accelerator torque MAP0; in case that the counter value equals to 1, controlling the acceleration-pedal to operate according to the accelerator torque MAP1; in case that the counter value equals to 2, controlling the acceleration-pedal to operate according to the accelerator torque MAP2; in case that the counter value equals to 3, controlling the acceleration-pedal to operate according to the accelerator torque MAP3; and in case that the counter value equals to 4, controlling the acceleration-pedal to operate according to the accelerator torque MAP4.

According to the acceleration-pedal control method of the present application, when the road conditions and the driving needs are varied, four accelerator torque MAPs (accelerator torque MAP1, accelerator torque MAP2, accelerator torque MAP3, accelerator torque MAP4) are generated according to the driving conditions to adapt to various working conditions. According to the different counter values, the acceleration-pedal can be applied to different accelerator torque MAPs, and a proper accelerator torque MAP can be automatically switched according to the working conditions, which can better adapt to the driving environment and driver needs, and meet the power and fuel efficiency requirements of the vehicle.

In some embodiments of the present application, the step of starting counting with the counter when the vehicle speed meets the preset speed condition includes:

determining whether a vehicle weight is greater than or equal to a vehicle weight threshold, wherein if yes, the counter value is added by 1, and if no, the counter value is added by 0;

determining whether a slope of a driving road is greater than or equal to 0.5% and less than 1.5%, wherein if yes, the counter value is added by 1, and if no, the counter value is added by 0;

determining whether the slope of the driving road is greater than or equal to 1.5%, wherein if yes, the counter value is added by 1, and if no, the counter value is added by 0; and determining an on-state of a vehicle E/P switch, wherein if the state of P is turned on, the counter value is added by 1, and if the state of E is turned on, the counter value is added by 0.

In some embodiments of the present application, in the step of obtaining an accelerator torques MAP1 to MAP4, the accelerator torques MAP1 to MAP4 are generated by following steps:

in case that the vehicle is running in a substantial constant speed state on a level road, obtaining two sets of level road speeds, two sets of level road wheel twisting forces, and two sets of driving road slopes;

in case that the vehicle is running in a substantial constant climbing speed state, obtaining two sets of climbing speeds, two sets of climbing wheel twisting forces, and two sets of driving road slopes;

calling a vehicle driving resistance equation;

based on the vehicle driving resistance equation, calculating an engine basic torque M1, an engine basic torque M2, an engine basic torque M3, and an engine basic torque M4; and generating the accelerator torque MAP1, the accelerator torque MAP2, the accelerator torque MAP3, and the accelerator torque MAP4.

In some embodiments of the present application, in the step of obtaining two sets of level road speeds, two sets of level road wheel twisting forces, and two sets of driving road slopes in the case that the vehicle is running in the substantial constant speed state on a level road, the substantial constant speed state on the level road is defined as follows:

within 20 seconds, a vehicle speed variation is less than ±2 km/h, the slope of the driving road is between −0.2% and 0.2%, a variance of the vehicle speed is less than a preset threshold of vehicle speed variance, and a variance of the acceleration-pedal opening value is greater than a preset threshold of opening value variance.

In some embodiments of the present application, in the step of obtaining two sets of climbing speeds, two sets of climbing wheel twisting forces, and two sets of driving road slopes in case that the vehicle is running in the substantial constant climbing speed state, the substantial constant climbing speed state is defined as follows:

within 20 seconds, a vehicle speed variation is less than ±2 km/h, the slope of the driving road is greater than 1% with a variation value being between −0.2% and 0.2%, a variance of the vehicle speed is less than a preset threshold of vehicle speed variance, and a variance of the opening value of the acceleration-pedal is greater than a preset threshold of opening value variance.

In some embodiments of the present application, the step of calling the vehicle driving resistance equation includes:

substituting the two sets of level road speeds, the two sets of level road wheel twisting force, the two sets of driving road slopes, the two sets of climbing speeds, the two sets of climbing wheel twisting force, and the two sets of driving road slopes into the vehicle driving resistance equation $f=a+b*v+c*v^2+\sin \alpha*mg$ to obtain a vehicle weight and coefficients a, b, and c, where, f represents the driving resistance of the vehicle, and also the wheel twisting force, in unit of N; v represents the vehicle speed, in unit of km/h; α represents the slope of the driving road, in unit of %; m represents the weight of the vehicle, in unit of kg; g represents the gravitational acceleration, in unit of $m/s^2$; the unit of a is N; the unit of b is N/km/h; and the unit of c is $N/km^2/h^2$.

In some embodiments of the present application, the step calculating the engine basic torques M1 to M4 based on the vehicle driving resistance equation includes:

substituting a first speed and a first slope into the vehicle driving resistance equation to calculate a first wheel twisting force, so as to obtain a first wheel torque and the engine basic torque M2;

based on M1=M2*0.6, calculating the engine basic torque M1;

substituting a second speed and a second slope into the vehicle driving resistance equation to calculate a second wheel twisting force, so as to obtain a second wheel torque and the engine basic torque M3; and substituting a third speed and a third slope into the vehicle driving resistance equation to calculate a third wheel twisting force, so as to obtain a third wheel torque and the engine basic torque M4.

In some embodiments of the present application, the accelerator torque MAP1 includes: $M_{MAP1}=0$ when the accelerator opening is set to 0% by the acceleration-pedal, $M_{MAP1}=0.9M1$ when the accelerator opening is set to 30% by the acceleration-pedal, $M_{MAP1}=0.4M_{max}$ when the accelerator opening is set to 50% by the acceleration-pedal, $M_{MAP1}=0.8M_{max}$ when the accelerator opening is set to 90% by the acceleration-pedal, and $M_{MAP1}=M_{max}$ when the accelerator opening is set to 100% by the acceleration-pedal;

the accelerator torque MAP2 includes: $M_{MAP2}=0$ when the accelerator opening is set to 0% by the acceleration-pedal, $M_{MAP2}=0.9M1$ when the accelerator opening is set to 30% by the acceleration-pedal, $M_{MAP2}=0.4M_{max}$ when the accelerator opening is set to 50% by the acceleration-pedal, $M_{MAP2}=0.8M_{max}$ when the accelerator opening is set to 90% by the acceleration-pedal, and $M_{MAP2}=M_{max}$ when the accelerator opening is set to 100% by the acceleration-pedal;

the accelerator torque MAP3 includes: $M_{MAP3}=0$ when the accelerator opening is set to 0% by the acceleration-pedal, $M_{MAP3}=0.9M1$ when the accelerator opening is set to 30% by the acceleration-pedal, $M_{MAP3}=0.4M_{max}$ when the accelerator opening is set to 50% by the acceleration-pedal, $M_{MAP3}=0.8M_{max}$ when the accelerator opening is set to 90% by the acceleration-pedal, and $M_{MAP3}=M_{max}$ when the accelerator opening is set to 100% by the acceleration-pedal; and the accelerator torque MAP4 includes: $M_{MAP4}=0$ when the accelerator opening is set to 0% by the acceleration-pedal, $M_{MAP4}=0.9M1$ when the accelerator opening is set to 30% by the acceleration-pedal, $M_{MAP4}=0.4M_{max}$ when the accelerator opening is set to 50% by the acceleration-pedal, $M_{MAP4}=0.8M_{max}$ when the accelerator opening is set to 90% by the acceleration-pedal, and $M_{MAP4}=M_{max}$ when the accelerator opening is set to 100% by the acceleration-pedal.

An acceleration-pedal control device for performing the acceleration-pedal control method is further provided in a second aspect of the present application.

The acceleration-pedal control device according to the embodiment of the present application has the same advantages as the above-mentioned acceleration-pedal control method, which are not repeated here.

An acceleration-pedal control system is further provided in a third aspect of the present application, which includes the above-mentioned acceleration-pedal control device, and further includes a memory. The memory stores program for the above-mentioned acceleration-pedal control method.

The acceleration-pedal control system according to the embodiment of the present application has the same advantages as the above-mentioned acceleration-pedal control method, which are not repeated here.

BRIEF DESCRIPTION OF THE DRAWINGS

Throughout the drawings, the same numeral references are used to indicate the same elements. In the accompany drawings:

FIG. 1 is a schematic flowchart of an acceleration-pedal control method according to an embodiment of the present application;

DETAILED DESCRIPTION OF THE EMBODIMENTS

It should be understood that the terms used herein are only for the purpose of describing specific exemplary embodiments and are not intended to limit. Unless otherwise explicitly stated in the context, singular forms such as "a", "an", and "the" used in the context can also indicate the inclusion of plural forms. The terms "including", "comprising", "containing", and "having" are inclusive and therefore indicate the existence of the described features, steps, operations, elements, and/or components, but do not exclude the existence or addition of one or more other features, steps, operations, elements, components, and/or their combinations. The methods, steps, processes, and operations described in the context are not interpreted as requiring them to be executed in the specific order described or explained, unless the order of execution is clearly indicated. It should also be understood that additional or alternative steps can be used.

Although the terms first, second, third, etc. can be used in the text to describe multiple elements, components, regions, layers, and/or sections, these elements, components, regions, layers, and/or sections should not be limited by these terms. These terms can be used only to distinguish one element, component, region, layer, or section from another region, layer, or section. Unless explicitly stated, terms such as "first", "second", and other numerical terms used in the context do not imply order or sequence. Therefore, the first element, component, region, layer or section discussed below can be referred to as the second element, component, region, layer or section without departing from the teachings of the exemplary embodiments.

For sake of description, spatial relative relationship terms can be used in the context to describe the relationship between a component or feature as shown in the figure and another component or feature. These relative relationship terms, such as "internal", "external", "inner", "outer", "lower", "below", "upper", "above", etc. This spatial relative relationship term refers to different orientations of devices in use or operation, excluding those depicted in the diagram. For example, if the device in the figure is turned over, the elements described as "below other components or features" or "under other components or features" will then be oriented as "above other components or features" or "on other components or features". Therefore, the example term "below" can include both upper and lower orientations. The device can be oriented otherwise (rotated 90 degrees or in other directions) and the spatial relative relation descriptors used herein are explained accordingly.

An accelerator torque MAP: a torque output by an engine is obtained by checking a MAP table based on a current speed and a pedaling depth.

Figure 2:
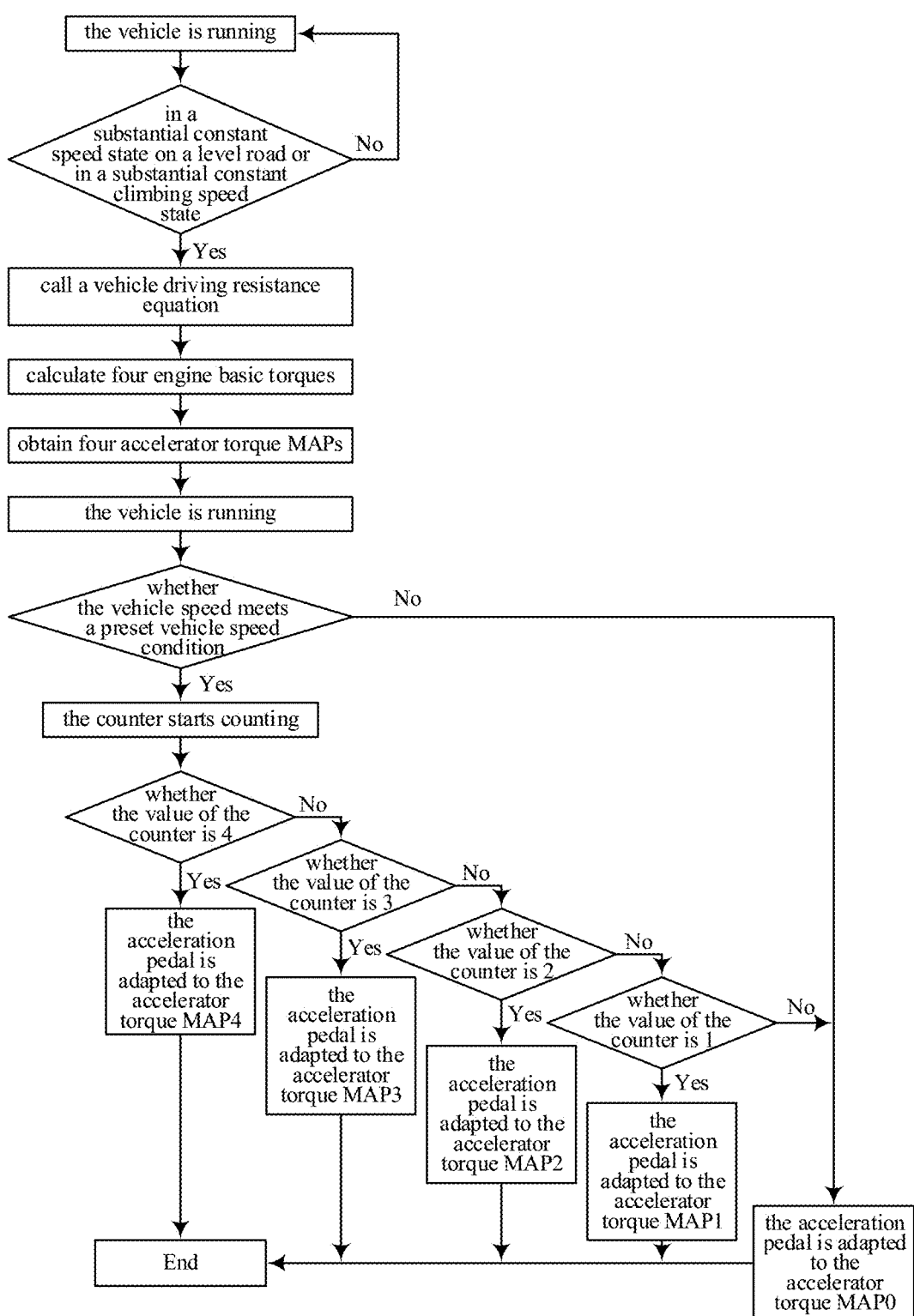
FIG. 2 is a schematic logic diagram of the acceleration-pedal control method according to an embodiment of the present application.

Referring to FIGS. 1 and 2, an acceleration-pedal control method is provided according to a first aspect of the present application, including the following steps:

S10: obtaining an accelerator torque MAP1, an accelerator torque MAP2, an accelerator torque MAP3, and an accelerator torque MAP4;

S20: based on an initial value of a counter equaling to zero, starting counting with the counter when a vehicle speed meets the preset speed conditions;

S30: in case that the counter value equals to zero, controlling the acceleration-pedal to operate according to the accelerator torque MAP0; in case that the counter value equals to 1, controlling the acceleration-pedal to operate according to the accelerator torque MAP1; in case that the counter value equals to 2, controlling the acceleration-pedal to operate according to the accelerator torque MAP2; in case that the counter value equals to 3, controlling the acceleration-pedal to operate according to the accelerator torque MAP3; or in case that the counter value equals to 4, controlling the acceleration-pedal to operate according to the accelerator torque MAP4.

According to the acceleration-pedal control method of the present application, when the road conditions and the driving needs are varied, four accelerator torque MAPs (accelerator torque MAP1, accelerator torque MAP2, accelerator torque MAP3, accelerator torque MAP4) are generated according to the driving conditions to adapt to various working conditions. According to the different counter values, the acceleration-pedal can be applied to different accelerator torque MAPs. A proper accelerator torque MAP may be automatically switched according to the working condition, which can better adapt to the driving environment and driver needs, and meet the power and fuel efficiency requirements of the vehicle.

Specifically, four accelerator torque MAPs, that adapt to various working conditions, are generated by the counter based on driving conditions, including vehicle weight, slope of driving road, and vehicle E/P switch. These driving conditions are not necessarily met in a special order. The specific judgment logic is as follows:

determining whether the vehicle weight is greater than or equal to the vehicle weight threshold, wherein if yes, the counter value is added by 1, and if no, the counter value is added by 0;

determining whether the slope of the driving road is greater than or equal to 0.5% and less than 1.5%, wherein if yes, the counter value is added by 1, and if no, the counter value is added by 0;

determining whether the slope of the driving road is greater than or equal to 1.5%, wherein if yes, the counter value is added by 1, and if no, the counter value is added by 0;

determining the on-state of the vehicle E/P switch, wherein if the state of P is turned on, the counter value is added by 1, and if the state of E is turned on, the counter value is added by 0.

It should be noted that when the slope of the driving road is greater than or equal to 0.5% and less than 1.5%, the counter value is added by 1. When the slope of the driving road is greater than or equal to both 0.5% and 1.5%, the counter value is added by 2. The E/P switch represents an interaction button of the vehicle with the driver onboard. When the driver selects P mode (power mode), it indicates a strong acceleration demand from the driver. When the driver selects E mode (economy mode), it indicates a strong fuel saving demand from the driver. The vehicle weight threshold is obtained by technicians through experimental calibration, which is 42000 kg.

In some embodiments of the present application, in the step where the counter starts counting based on the vehicle speed meeting the preset speed condition, the preset speed condition is continuously higher than 75 km/h for 180 seconds. When the vehicle speed does not meet the preset speed condition or when the vehicle speed is below 30 km/h, the counter does not start counting, and the acceleration-pedal is adapted to the accelerator torque MAP0, which comes from the factory setting.

Specifically, the engine can operate based on the generated accelerator torque MAP1, accelerator torque MAP2, accelerator torque MAP3, and accelerator torque MAP4, so that when the acceleration-pedal is stepped to the same extent, the engine can output different torques. In the step of obtaining the accelerator torques MAP1 to MAP4, they are generated by the following steps:

in case that the vehicle is running in a substantial constant speed state on a level road, obtaining two sets of level road speeds, two sets of level road wheel twisting forces, and two sets of driving road slopes;

in case that the vehicle is running in a substantial constant climbing speed state, obtaining two sets of climbing speeds, two sets of climbing wheel twisting forces, and two sets of driving road slopes;

calling the vehicle driving resistance equation;

based on the vehicle driving resistance equation, calculating an engine basic torque M1, an engine basic torque M2, an engine basic torque M3, and an engine basic torque M4; and generating the accelerator torque MAP1, the accelerator torque MAP2, the accelerator torque MAP3, and the accelerator torque MAP4.

Herein, the substantial constant speed state on the level road is that: obtaining a vehicle speed every 0.1 second within 20 seconds, the vehicle speed variation is less than ±2 km/h, the slope of the driving road is between −0.2% and 0.2%, the variance of the vehicle speeds is less than the preset threshold of vehicle speed variance, and the variance of the acceleration-pedal opening value is greater than the preset threshold of opening value variance.

The substantial constant climbing speed state is that: obtaining the vehicle speed every 0.1 second within 20 seconds, the vehicle speed variation is less than ±2 km/h, the slope of the driving road is greater than 1% and varied between −0.2% and 0.2%, the variance of the vehicle speed is less than the preset threshold of vehicle speed variance, and the variance of the opening value of the acceleration-pedal is greater than the preset threshold of opening value variance.

It should be noted that the term "the opening of the acceleration-pedal" in "the variance of the opening value of the acceleration-pedal" refers to the opening of the accelerator. For example, when the pressing opening of the acceleration-pedal is 30%, it indicates that the opening of the accelerator is also 30%. The preset threshold of the vehicle speed variance and the preset threshold of the opening value variance are both obtained through experimental calibration by technical personnel. Both the difference between the two sets of level road speeds and the difference between the two sets of climbing speeds should be greater than 10 km/h to ensure the effectiveness of the calculation and avoid a big error caused by the difference being too small.

In some embodiments of the present application, the step of calling the vehicle driving resistance equation includes:

substitute two sets of level road speeds, two sets of level road wheel twisting forces, two sets of driving road slopes, two sets of climbing speeds, two sets of climbing wheel twisting force and two sets of driving road slopes into the vehicle driving resistance equation $f=a+b*v+c*v^2+\sin \alpha *mg$ to obtain the vehicle weight and coefficients a, b and c, where, f represents the driving resistance of the vehicle, and also the wheel twisting force, in unit of N; v represents the vehicle speed, in unit of km/h; α represents the slope of the driving road, which is commonly expressed as a percentage in engineering, in unit of %; m represents the weight of the vehicle, in unit of kg; g represents the gravitational acceleration, in unit of m/s²; the unit of a is N; the unit of b is N/km/h; and the unit of c is N/km²/h².

Obviously, there are four unknowns in the vehicle driving resistance equation, i.e., vehicle weight and coefficients a, b, and c. Therefore, the four unknowns can be calculated based on two sets of level road speeds, two sets of level road wheel twisting forces, two sets of driving road slopes, two sets of climbing speeds, two sets of climbing wheel twisting force, and two sets of driving road slopes, i.e., a total of four sets of values.

Specifically, after obtaining the vehicle driving resistance equation, it is necessary to calculate the engine basic torque M1, engine basic torque M2, engine basic torque M3, and engine basic torque M4 based on the vehicle driving resistance equation.

The calculation method for the engine basic torque M2 is described. When the vehicle is running on a level road in the highest gear, the first speed is 85 km/h. Thus, the first speed and the first slope can be obtained at this time. Since the vehicle weight and coefficients a, b, and c in the vehicle driving resistance equation are known, the vehicle speed and the slope of the driving road can be substituted into the vehicle driving resistance equation to obtain the vehicle driving resistance, which is also the first wheel twisting force. Next, the first wheel twisting force is divided by the wheel radius to obtain the wheel torque, which equals to the value obtained by multiplying the engine torque by the transmission coefficient ratio of the gearbox, etc. Therefore, the engine basic torque M2 can be obtained by dividing the wheel torque by the transmission coefficient ratio.

The calculation method for the engine basic torque M1 is described. Based on M1=M2*0.6, the engine basic torque M1 is obtained. The vehicle is running on a level road with no load and at speed of 85 km/h.

The calculation method for the engine basic torque M3 is described. The vehicle is running on a second slope of 0.5% in the highest gear, the second speed is 85 km/h. Therefore, the second speed and second slope can be obtained. The calculation method for the engine basic torque M3 is the same as that for the engine basic torque M2, and thus is not repeated here.

The calculation method for the engine basic torque M4 is described. The vehicle is running on a third slope of 1.5% in the highest gear, a third speed is 80 km/h. Therefore, the third speed and the third slope can be obtained. The calculation method for the engine basic torque M4 is the same as the engine basic torque M2, and thus is not repeated here.

Specifically, after obtaining the engine basic torques M1 to M4, the accelerator torques MAP1 to MAP4 are generated based on the engine basic torques M1 to M4.

Figure 3:
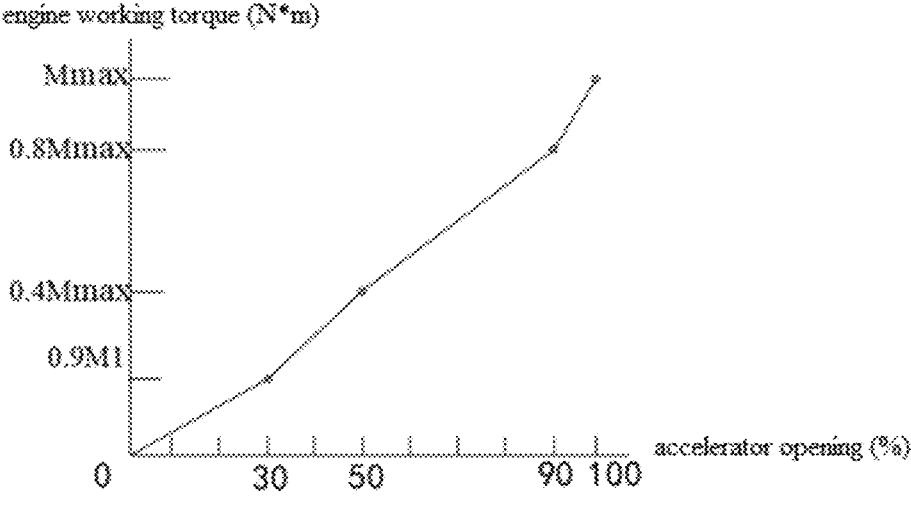
FIG. 3 is a schematic graph of an accelerator torque MAP1 according to an embodiment of the present application.

The generation of the accelerator torque MAP1 includes the following steps. First, the accelerator pedal opening or the accelerator opening is set as the horizontal axis, and the engine working torque is set as the vertical axis. Then, five key points are obtained, specifically, when the accelerator opening is controlled to be 0% by the acceleration-pedal, the corresponding engine working torque is 0, i.e., $M_{MAP1}=0$; when the accelerator opening is controlled to be 30% by the acceleration-pedal, the corresponding engine working torque is M1*0.9, i.e., $M_{MAP1}=0.9M1$; when the accelerator opening is controlled to be 50% by the acceleration-pedal, the corresponding engine working torque is 0.4 times the maximum engine working torque, i.e., $M_{MAP1}=0.4M_{max}$; when the accelerator opening is controlled to be 90% by the acceleration-pedal, the corresponding engine working torque is 0.8 times the maximum engine working torque, i.e., $M_{MAP1}=0.8M_{max}$; and when the accelerator opening is controlled to be 100% by the acceleration-pedal, the corresponding engine working torque is the maximum engine working torque, i.e., $M_{MAP1}=M_{max}$. Then, the five key points are connected with straight lines to generate the accelerator torque MAP1, as shown in FIG. 3.

Figure 4:
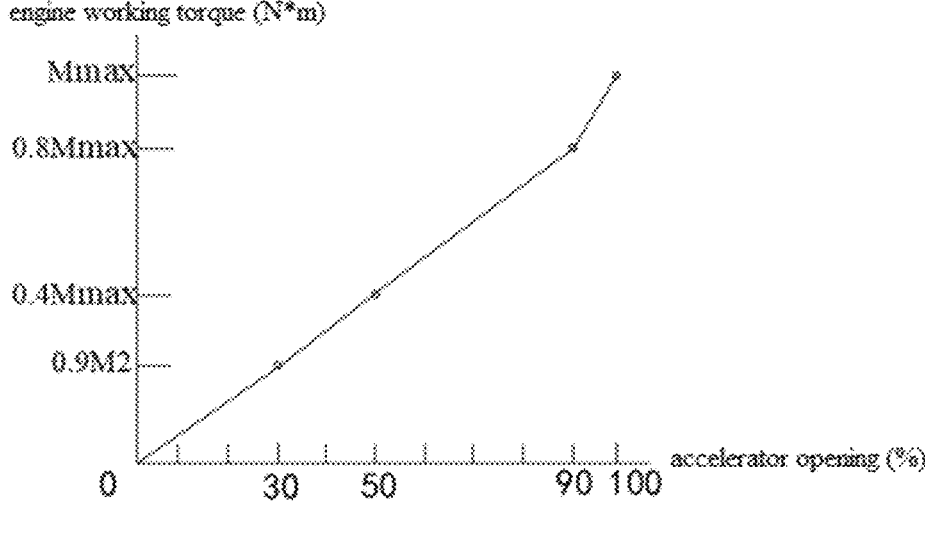
FIG. 4 is a schematic graph of an accelerator torque MAP2 according to an embodiment of the present application.

The generation of the accelerator torque MAP2 includes the following steps. First, the acceleration-pedal opening or the accelerator opening is set as the horizontal axis, and the engine working torque is set as the vertical axis. Then, five key points are obtained: when the accelerator opening is controlled to be 0% by the acceleration-pedal, the corresponding engine working torque is 0, i.e., $M_{MAP2}=0$; when the accelerator opening is controlled to be 30% by the acceleration-pedal, the corresponding engine working torque is M2*0.9, i.e., $M_{MAP2}=0.9M2$; when the accelerator opening is controlled to be 50% by the acceleration-pedal, the corresponding engine working torque is 0.4 times the maximum engine working torque, i.e., $M_{MAP2}=0.4M_{max}$; when the accelerator opening is controlled to be 90% by the acceleration-pedal, the corresponding engine working torque is 0.8 times the maximum engine working torque, i.e., $M_{MAP2}=0.8M_{max}$; and when the accelerator opening is controlled to be 100% by the acceleration-pedal, the corresponding engine working torque is the maximum engine working torque, i.e., $M_{MAP2}=M_{max}$. Then, the five key points are connected with straight lines to generate the accelerator torque MAP2, as shown in FIG. 4.

Figure 5:
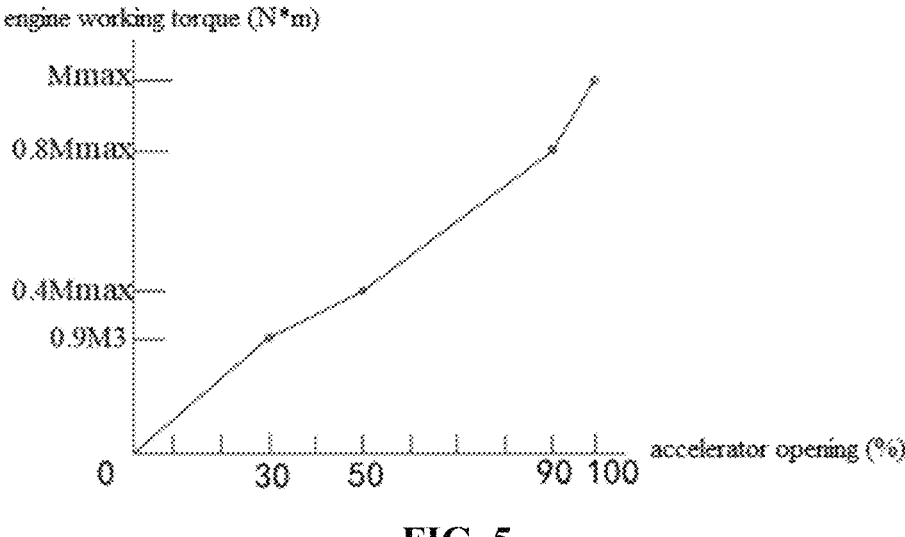
FIG. 5 is a schematic graph of an accelerator torque MAP3 according to an embodiment of the present application.

The generation of the accelerator torque MAP3 includes the following steps. First, the acceleration-pedal opening or the accelerator opening is set as the horizontal axis, and the engine working torque is set as the vertical axis. Then, five key points are obtained: when the accelerator opening is controlled to be 0% by the acceleration-pedal, the corresponding engine working torque is 0, i.e., $M_{MAP3}=0$; when the accelerator opening is controlled to be 30% by the acceleration-pedal, the corresponding engine working torque is M3*0.9, i.e., $M_{MAP3}=0.9M3$; when the accelerator opening is controlled to be 50% by the acceleration-pedal, the corresponding engine working torque is 0.4 times the maximum engine working torque, i.e., $M_{MAP3}=0.4M_{max}$; when the accelerator opening is controlled to be 90% by the acceleration-pedal, the corresponding engine working torque is 0.8 times the maximum engine working torque, i.e., $M_{MAP3}=0.8M_{max}$; and when the accelerator opening is controlled to be 100% by the acceleration-pedal, the corresponding engine working torque is the maximum engine working torque, i.e., $M_{MAP3}=M_{max}$. Then, the five key points are connected with straight lines to generate the accelerator torque MAP3, as shown in FIG. 5.

Figure 6:
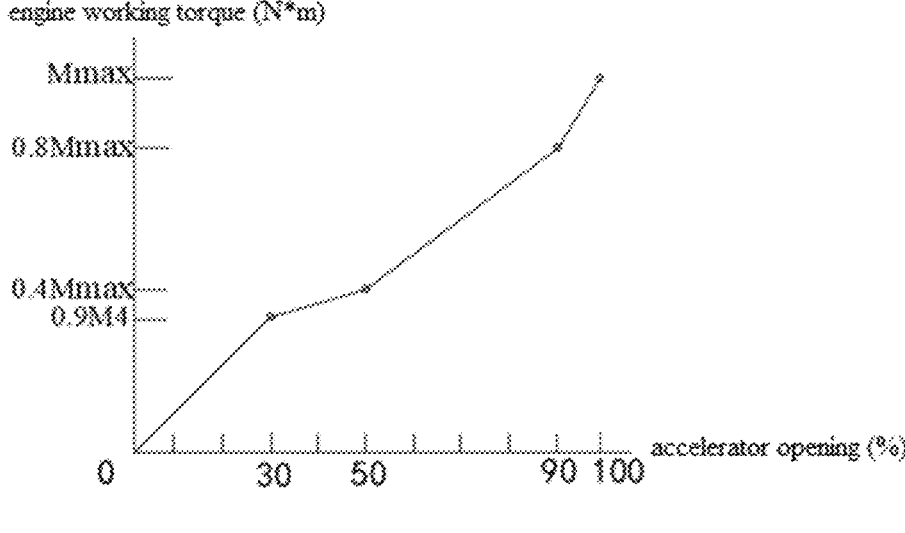
FIG. 6 is a schematic graph of an accelerator torque MAP4 according to an embodiment of the present application.

The generation of the accelerator torque MAP4 includes the following steps. First, the acceleration-pedal opening or the accelerator opening is set as the horizontal axis, and the engine working torque is set as the vertical axis. Then, five key points are obtained: when the accelerator opening is controlled to be 0% by the acceleration-pedal, the corresponding engine working torque is 0, i.e., $M_{MAP4}=0$; when the accelerator opening is controlled to be 30% by the acceleration-pedal, the corresponding engine working torque is M4*0.9, i.e., $M_{MAP4}=0.9M4$; when the accelerator opening is controlled to be 50% by the acceleration-pedal, the corresponding engine working torque is 0.4 times the maximum engine working torque, i.e., $M_{MAP4}=0.4M_{max}$; when the accelerator opening is controlled to be 90% by the acceleration-pedal, the corresponding engine working torque is 0.8 times the maximum engine working torque, i.e., $M_{MAP4}=0.8M_{max}$; and when the accelerator opening is controlled to be 100% by the acceleration-pedal, the corresponding engine working torque is the maximum engine working torque, i.e., $M_{MAP4}=M_{max}$. Then, the five key points are connected with straight lines to generate the accelerator torque MAP4, as shown in FIG. 6.

It should be noted that the maximum engine working torque ($M_{max}$) is known, which has been already determined in factory. Moreover, for the above four accelerator torque MAPs, the section of the line between the accelerator openings of 30% and of 50% is gradually inclined upward, that is to say, when the accelerator opening increases from 30% to 50%, 0.9M1, 0.9M2, 0.9M3 and 0.9M4 gradually increase to $0.4M_{max}$.

In summary, according to the acceleration-pedal control method of the present application, a proper accelerator torque MAP can be automatically shifted according to the working conditions, which can better adapt to the driving environment and needs of the driver, and meet the power and fuel saving needs of the vehicle, achieving a collaboration of driver, vehicle, and road. The torque can be controlled more reasonably with reduced transients by adaptive optimization of a pedal response capability. Meanwhile, the acceleration-pedal control method gets involved in driving control in real time, without the need for cruise conditions or an additional hardware such as TBOX.

An acceleration-pedal control device for carrying out the above-mentioned acceleration-pedal control method is further provided in a second aspect of the present application.

The acceleration-pedal control device according to the embodiment of the present application has the same advantages as the above-mentioned acceleration-pedal control method, which are not repeated here.

An acceleration-pedal control system is further provided in a third aspect of the present application, which includes the above-mentioned acceleration-pedal control device, and further includes a memory. The memory stores program for the above-mentioned acceleration-pedal control method.

The acceleration-pedal control system according to the embodiment of the present application has the same advantages as the above-mentioned acceleration-pedal control method, which are not repeated here.

What is claimed is:

1. An acceleration-pedal control method, comprising the steps of:

obtaining an accelerator torque MAP1, an accelerator torque MAP2, an accelerator torque MAP3, and an accelerator torque MAP4;

based on an initial value of a counter equaling to zero, starting counting with the counter when a vehicle speed meets a preset speed condition; and controlling an acceleration-pedal to operate according to an accelerator torque MAP0 in case of a counter value of 0, according to the accelerator torque MAP1 in case of the counter value of 1, according to the accelerator torque MAP2 in case of the counter value of 2, according to the accelerator torque MAP3 in case of the counter value of 3, or according to the accelerator torque MAP4 in case of the counter value of 4, wherein, in the step of obtaining the accelerator torques MAP1 to MAP4, the accelerator torques MAP1 to MAP4 are generated by the steps of:

obtaining two sets of level road speeds, two sets of level road wheel twisting forces, and two sets of driving road slopes in case that the vehicle is running in a substantial constant speed state on a level road;

obtaining two sets of climbing speeds, two sets of climbing wheel twisting forces, and two sets of driving road slopes in case that the vehicle is running in a substantial constant climbing speed state;

calling a vehicle driving resistance equation;

calculating an engine basic torque M1, an engine basic torque M2, an engine basic torque M3, and an engine basic torque M4 based on the vehicle driving resistance equation; and generating the accelerator torque MAP1, the accelerator torque MAP2, the accelerator torque MAP3, and the accelerator torque MAP4.

2. The acceleration-pedal control method according to claim 1, wherein the step of starting counting with the counter when the vehicle speed meets the preset speed condition comprises:

determining whether a vehicle weight is greater than or equal to a vehicle weight threshold, wherein if yes, the counter value is added by 1, and if no, the counter value is added by 0;

determining whether a slope of a driving road is greater than or equal to 0.5% and less than 1.5%, wherein if yes, the counter value is added by 1, and if no, the counter value is added by 0;

determining whether the slope of the driving road is greater than or equal to 1.5%, wherein if yes, the counter value is added by 1, and if no, the counter value is added by 0; and determining an on-state of a vehicle E/P switch, wherein if a state of P is switched on, the counter value is added by 1, and if a state of E is switched on, the counter value is added by 0.

3. The acceleration-pedal control method according to claim 1, wherein, in the step of obtaining two sets of level road speeds, two sets of level road wheel twisting forces, and two sets of driving road slopes in case that the vehicle is running in the substantial constant speed state on the level road, the substantial constant speed state on the level road is defined as follows:

within 20 seconds, a vehicle speed variation is less than ±2 km/h, a slope of a driving road is between −0.2% and 0.2%, a variance of a vehicle speed is less than a preset threshold of vehicle speed variance, and a variance of an acceleration-pedal opening value is greater than a preset threshold of opening value variance.

4. The acceleration-pedal control method according to claim 1, wherein, in the step of obtaining two sets of climbing speeds, two sets of climbing wheel twisting forces, and two sets of driving road slopes in case that the vehicle is running in the substantial constant climbing speed state, the substantial constant climbing speed state is defined as follows:

within 20 seconds, a vehicle speed variation is less than ±2 km/h, a slope of a driving road is greater than 1% with a variation value being between −0.2% and 0.2%, a variance of a vehicle speed is less than a preset threshold of vehicle speed variance and a variance of an opening value of the acceleration-pedal is greater than a preset threshold of opening value variance.

5. The acceleration-pedal control method according to claim 1, wherein the step of calling the vehicle driving resistance equation comprises:

substituting the two sets of level road speeds, the two sets of level road wheel twisting forces, the two sets of driving road slopes, the two sets of climbing speeds, the two sets of climbing wheel twisting forces, and the two sets of driving road slopes into the vehicle driving resistance equation $f=a+b*v+c*v^2+\sin \alpha*mg$ to obtain a vehicle weight and coefficients a, b and c, where, f represents a driving resistance of a vehicle and also the wheel twisting force, in unit of N; v represents a vehicle speed, in unit of km/h; $\alpha$ represents a slope of a driving road, in unit of %; m represents a weight of a vehicle, in unit of kg; g represents the gravitational acceleration, in unit of m/s²; the unit of a is N; the unit of b is N/km/h; and the unit of c is N/km²/h².

6. The acceleration-pedal control method according to claim 1, wherein the step of calculating the engine basic torques M1 to M4 based on the vehicle driving resistance equation comprises:

substituting a first speed and a first slope into the vehicle driving resistance equation to calculate a first wheel twisting force, so as to obtain a first wheel torque and the engine basic torque M2;

based on M1=M2*0.6, calculating the engine basic torque M1;

substituting a second speed and a second slope into the vehicle driving resistance equation to calculate a second wheel twisting force, so as to obtain a second wheel torque and thus the engine basic torque M3; and substituting a third speed and a third slope into the vehicle driving resistance equation to calculate a third wheel twisting force, so as to obtain a third wheel torque and thus the engine basic torque M4.

7. The acceleration-pedal control method according to claim 6, wherein, in the step of generating the accelerator torques MAP1 to MAP4, the accelerator torque MAP1 comprises: $M_{MAP1}=0$ when the accelerator opening is controlled to be 0% by the acceleration-pedal, $M_{MAP1}=0.9M1$ when the accelerator opening is controlled to be 30% by the acceleration-pedal, $M_{MAP1}=0.4M_{max}$ when the accelerator opening is controlled to be 50% by the acceleration-pedal, $M_{MAP1}=0.8M_{max}$ when the accelerator opening is controlled to be 90% by the acceleration-pedal, and $M_{MAP1}=M_{max}$ when the accelerator opening is controlled to be 100% by the acceleration-pedal;

the accelerator torque MAP2 comprises: $M_{MAP2}=0$ when the accelerator opening is controlled to be 0% by the acceleration-pedal, $M_{MAP2}=0.9M2$ when the accelerator opening is controlled to be 30% by the acceleration-pedal, $M_{MAP2}=0.4M_{max}$ when the accelerator opening is controlled to be 50% by the acceleration-pedal, $M_{MAP2}=0.8M_{max}$ when the accelerator opening is controlled to be 90% by the acceleration-pedal, and $M_{MAP2}=M_{max}$ when the accelerator opening is controlled to be 100% by the acceleration-pedal;

the accelerator torque MAP3 comprises: $M_{MAP3}=0$ when the accelerator opening is controlled to be 0% by the acceleration-pedal, $M_{MAP3}=0.9M3$ when the accelerator opening is controlled to be 30% by the acceleration-pedal, $M_{MAP3}=0.4M_{max}$ when the accelerator opening is controlled to be 50% by the acceleration-pedal, $M_{MAP3}=0.8M_{max}$ when the accelerator opening is controlled to be 90% by the acceleration-pedal, and $M_{MAP3}=M_{max}$ when the accelerator opening is controlled to be 100% by the acceleration-pedal; and the accelerator torque MAP4 comprises: $M_{MAP4}=0$ when the accelerator opening is controlled to be 0% by the acceleration-pedal, $M_{MAP4}=0.9M4$ when the accelerator opening is controlled to be 30% by the acceleration-pedal, $M_{MAP4}=0.4M_{max}$ when the accelerator opening is controlled to be 50% by the acceleration-pedal, $M_{MAP4}=0.8M_{max}$ when the accelerator opening is controlled to be 90% by the acceleration-pedal, and $M_{MAP4}=M_{max}$ when the accelerator opening is controlled to be 100% by the acceleration-pedal.

8. An acceleration-pedal control device for carrying out an acceleration-pedal control method, wherein the acceleration-pedal control method comprises the steps of:

obtaining an accelerator torque MAP1, an accelerator torque MAP2, an accelerator torque MAP3, and an accelerator torque MAP4;

based on an initial value of a counter equaling to zero, starting counting with the counter when a vehicle speed meets a preset speed condition; and controlling an acceleration-pedal to operate according to an accelerator torque MAP0 in case of a counter value of 0, according to the accelerator torque MAP1 in case of the counter value of 1, according to the accelerator torque MAP2 in case of the counter value of 2, according to the accelerator torque MAP3 in case of the counter value of 3, or according to the accelerator torque MAP4 in case of the counter value of 4, wherein, in the step of obtaining the accelerator torques MAP1 to MAP4, the accelerator torques MAP1 to MAP4 are generated by the steps of:

obtaining two sets of level road speeds, two sets of level road wheel twisting forces, and two sets of driving road slopes in case that the vehicle is running in a substantial constant speed state on a level road;

obtaining two sets of climbing speeds, two sets of climbing wheel twisting forces, and two sets of driving road slopes in case that the vehicle is running in a substantial constant climbing speed state;

calling a vehicle driving resistance equation;

calculating an engine basic torque M1, an engine basic torque M2, an engine basic torque M3, and an engine basic torque M4 based on the vehicle driving resistance equation; and generating the accelerator torque MAP1, the accelerator torque MAP2, the accelerator torque MAP3, and the accelerator torque MAP4.

9. An acceleration-pedal control system, comprising:

an acceleration-pedal control device for carrying out an acceleration-pedal control method; and a memory storing a program for implementing the acceleration-pedal control method, wherein the acceleration-pedal control method comprises the steps of:

obtaining an accelerator torque MAP1, an accelerator torque MAP2, an accelerator torque MAP3, and an accelerator torque MAP4;

based on an initial value of a counter equaling to zero, starting counting with the counter when a vehicle speed meets a preset speed condition; and controlling an acceleration-pedal to operate according to an accelerator torque MAP0 in case of a counter value of zero, according to the accelerator torque MAP1 in case of the counter value of 1, according to the accelerator torque MAP2 in case of the counter value of 2, according to the accelerator torque MAP3 in case of the counter value of 3, or according to the accelerator torque MAP4 in case of the counter value of 4, wherein, in the step of obtaining the accelerator torques MAP1 to MAP4, the accelerator torques MAP1 to MAP4 are generated by the steps of:

obtaining two sets of level road speeds, two sets of level road wheel twisting forces, and two sets of driving road slopes in case that the vehicle is running in a substantial constant speed state on a level road;

obtaining two sets of climbing speeds, two sets of climbing wheel twisting forces, and two sets of driving road slopes in case that the vehicle is running in a substantial constant climbing speed state;

calling a vehicle driving resistance equation;

calculating an engine basic torque M1, an engine basic torque M2, an engine basic torque M3, and an engine basic torque M4 based on the vehicle driving resistance equation; and generating the accelerator torque MAP1, the accelerator torque MAP2, the accelerator torque MAP3, and the accelerator torque MAP4.

* * * * *